US012005854B2

(12) United States Patent
Ozcan et al.

(10) Patent No.: US 12,005,854 B2
(45) Date of Patent: Jun. 11, 2024

(54) APPARATUS FOR RETAINING A SEAT BELT

(71) Applicant: JAGUAR LAND ROVER LIMITED, Coventry (GB)

(72) Inventors: Zafer Ozcan, Coventry (GB); William Clements, Coventry (GB); Mark Lambert, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 17/998,019

(22) PCT Filed: May 5, 2021

(86) PCT No.: PCT/EP2021/061899
§ 371 (c)(1),
(2) Date: Nov. 4, 2022

(87) PCT Pub. No.: WO2021/224345
PCT Pub. Date: Nov. 11, 2021

(65) Prior Publication Data
US 2023/0166686 A1    Jun. 1, 2023

(30) Foreign Application Priority Data
May 5, 2020   (GB) ...................... 2006639

(51) Int. Cl.
*B60R 22/26*   (2006.01)
*B60N 2/02*    (2006.01)
(Continued)

(52) U.S. Cl.
CPC ............... *B60R 22/26* (2013.01); *B60N 2/02* (2013.01); *B60N 2/20* (2013.01); *B60N 2/3013* (2013.01);
(Continued)

(58) Field of Classification Search
CPC ... B60R 22/26; B60R 22/18; B60R 2022/263; B60R 2022/266; B60R 2022/1818;
(Continued)

(56) References Cited

U.S. PATENT DOCUMENTS 5,855,414 A * 1/1999 Daniel ................... B60N 2/366
                                                              297/378.12
2008/0309111 A1  12/2008 Marriott et al.
(Continued)

FOREIGN PATENT DOCUMENTS

JP    2009090963 A    4/2009
JP    2011162165 A    8/2011
(Continued)

OTHER PUBLICATIONS

Great Britain Intellectual Property Office, Combined Search and Examination Report under Sections 17 and 18(3) Issued in Application No. GB2006639.5, dated Oct. 9, 2020, 7 pages.
ISA European Patent Office, International Search Report and Written Opinion Issued in Application No. PCT/EP2021/061899, dated Nov. 16, 2021, WIPO, 11 pages.

*Primary Examiner* — Keith J Frisby
(74) *Attorney, Agent, or Firm* — McCoy Russell LLP

(57) ABSTRACT

Embodiments of the present invention provide a seat belt retainer for a vehicle, the retainer comprising a body having an opening, the body being configured for attachment to a support. An actuator is mounted within the opening, the actuator being moveable within the opening for actuating a seat latch mechanism. A guide is supported by the body, the guide defining an at least partial aperture for receiving a seat belt therethrough. The actuator and the guide are at least partly aligned along the longitudinal axis of the seat belt passing through the aperture, in use.

20 Claims, 5 Drawing Sheets

(51) Int. Cl.
  *B60N 2/20* (2006.01)
  *B60N 2/30* (2006.01)
  *B60N 2/68* (2006.01)
  *B60N 2/90* (2018.01)
  *B60R 22/18* (2006.01)
  *B60R 22/48* (2006.01)
(52) U.S. Cl.
  CPC .............. *B60N 2/688* (2013.01); *B60N 2/919* (2018.02); *B60N 2002/952* (2018.02); *B60R 2022/1818* (2013.01); *B60R 2022/266* (2013.01); *B60R 2022/4866* (2013.01)
(58) Field of Classification Search
  CPC .......... B60N 2/688; B60N 2/366; B60N 2/20; B60N 2/919; B60N 2/2245; B60N 2/3013; B60N 2/3002; B60N 2/3004; B60N 2/3009; B60N 2/3011; B60N 2/36; B60N 2/02; B60N 2/32; B60N 2/34; B60N 2002/952; B60N 2002/971; B60N 2205/40; B60N 2205/50

USPC ......... 280/801, 807, 808; 297/378.1, 378.12, 297/378.13, 483; 296/65.05, 65.09, 296/65.16, 65.17
  See application file for complete search history.

(56) References Cited

U.S. PATENT DOCUMENTS

| | | |
|---|---|---|
| 2010/0213747 A1 | 8/2010 | Lindsay |
| 2014/0070589 A1* | 3/2014 | Teufel ................... B60N 2/366 |
| | | 297/378.13 |
| 2019/0031068 A1* | 1/2019 | Pasternak ............. B60N 2/919 |

FOREIGN PATENT DOCUMENTS

| | | | |
|---|---|---|---|
| JP | 2017030643 A | * | 2/2017 |
| JP | 2018039424 A | | 3/2018 |
| WO | 2019131280 A1 | | 7/2019 |

\* cited by examiner

APPARATUS FOR RETAINING A SEAT BELT

CROSS REFERENCE TO RELATED APPLICATIONS

The present application is a U.S. National Phase of International Application No. PCT/EP2021/061899 entitled "APPARATUS FOR RETAINING A SEAT BELT," and filed on May 5, 2021. International Application No. PCT/EP2021/061899 claims priority to Great Britain Patent Application No. 2006639.5 filed on May 5, 2020. The entire contents of each of the above-listed applications are hereby incorporated by reference for all purposes.

TECHNICAL FIELD

The present disclosure relates to a seat belt retainer and particularly, but not exclusively, to a seat belt retainer defining an at least partial aperture for receiving a seat belt therethrough and having an actuator for actuating a seat latch mechanism. Aspects of the invention relate to a seat belt retainer, to an assembly and to a vehicle.

BACKGROUND

Seat belts form part of a restraining system in a vehicle. Seat belts are known to prevent or reduce injuries sustained during a collision or sudden stop. Most vehicles use a 3-point seat belt where the seat belt passes over both the occupant's lap and chest. For optimal distribution of forces during a crash, some seat belts should pass across the chest and rest over a shoulder of an occupant. If the seat belt is incorrectly positioned, it may rest across the occupant's neck resulting in high forces on the neck during a collision or sudden stop. The position of a seat belt across an occupant depends on the occupant's height and the position of a seat belt retractor. For example, a seat belt may pass over the shoulder of an adult, but the same seat belt may pass over the neck of a child that is sat on a booster seat located on top of a vehicle seat. Therefore, a path taken by a seat belt needs to be adjusted depending on the height of the occupant for optimal performance.

In certain vehicles, the position of a seat belt may be changed by varying the height of where the seat belt egresses from a B-pillar. However, this is not always appropriate depending on the design of the vehicle, such as dependent upon a location of seats in relation to the B-pillar. In some vehicles, a retainer is provided in the vehicle to constrain the path of the seat belt, such retainers would need to fit within the space constraints of the vehicle. Additionally, to provide optimal distribution of forces during a collision or sudden stop, a device that modifies the path of a seat belt would need to be able to withstand any incident forces received from the seat belt during the collision or sudden stop.

It is an object of embodiments of the invention to at least mitigate one or more of the problems of the prior art.

SUMMARY OF THE INVENTION

Aspects and embodiments of the invention provide a seat belt retainer, an assembly and a vehicle for retaining a seat belt.

In accordance with an aspect of the present invention there is provided, a seat belt retainer for a vehicle, the retainer comprising:
 a body having an opening;
 an actuator mounted within the opening, the actuator being moveable within the opening;
 a guide supported by the body, the guide configured to receive a seat belt;
 wherein the actuator and the guide are at least partly aligned along the longitudinal axis of the seat belt when received by the guide, in use. The guide may be used to adapt the position of a seat belt and the at least partial alignment of the actuator and the guide reduce the space required in a vehicle to accommodate the seat belt retainer.

In accordance with an aspect of the present invention there is provided, a seat belt retainer for a vehicle, the retainer comprising:
 a body having an opening, the body being configured for attachment to a support;
 an actuator mounted within the opening, the actuator being moveable within the opening for actuating a seat latch mechanism;
 a guide supported by the body, the guide defining an at least partial aperture for receiving a seat belt therethrough;
 wherein the actuator and the guide are at least partly aligned along the longitudinal axis of the seat belt passing through the aperture, in use. The guide may be used to adapt the position of a seat belt and the at least partial alignment of the actuator and the guide reduce the space required in a vehicle to accommodate the seat belt. Furthermore, in use, forces incident on the seat belt retainer from a seat belt may be generally transmitted to the support.

In certain embodiments, the actuator and the guide may be substantially aligned along the longitudinal axis of the seat belt passing through the aperture, in use. The substantial alignment of the actuator and aperture further reduces the space required in a vehicle to accommodate the seat belt retainer.

In certain embodiments, the actuator may comprise a push button. The push button provides an actuator which occupies minimal space and simplifies the integration of the guide and the actuator into the seat belt retainer.

The seat belt retainer may comprise an indicator for indicating a status of the seat latch mechanism. As such, a user can easily observe whether the latch mechanism is engaged or disengaged.

The indicator may at least partially surround the actuator. This improves the versatility of the actuator because the status of the actuator may be observed by the user from a plurality of different locations. In certain embodiments, the seat belt retainer may comprise a bezel at least partially surrounding the actuator, wherein at least a portion of the bezel comprises the indicator. The bezel may improve the strength of the seat belt retainer.

In certain embodiments, the guide may be integral with the body. As such, the manufacture of the seat belt retainer may be simplified.

The guide may comprise an at least partial loop. In use, the guide may enable a seat belt to pass therethrough without substantially deforming the shape of the seat belt. The guide may comprise a slot for inserting the seat belt into, or releasing the seat belt from, the aperture. As such, the seat belt may be easily inserted into or released from the guide.

In certain embodiments, the aperture may be inclined relative to the body. The inclination of the aperture may further improve the position of a seat belt across an occupant during use.

In certain embodiments, the support may be the seat latch mechanism. In use, forces incident on the seat belt retainer from a seat belt may be generally transmitted to the latch mechanism.

In accordance with another aspect of the present invention there is provided, an assembly comprising: the seat belt retainer as described above; and a seat latch mechanism.

The seat belt retainer may be attached to the seat latch mechanism so that, in use, forces incident on the retainer from a seat belt are generally transmitted to the latch mechanism. Consequently, the assembly may withstand any forces received from the seat belt during a collision or sudden stop.

In certain embodiments, the seat belt retainer is attached to the seat latch mechanism by a plurality of fixings. The plurality of fixings provides a secure connection between the seat belt retainer and the seat latch mechanism. The plurality of fixings may comprise screws.

The seat latch mechanism may comprise shoulders for supporting the seat belt retainer thereon. The shoulders of the latch mechanism may be configured to withstand occupant deceleration forces received via the retainer. The assembly has the strength to withstand occupant deceleration forces received via the retainer.

In accordance with another aspect of the present invention there is provided a vehicle comprising a seat belt retainer as described above.

In accordance with another aspect of the present invention there is provided a vehicle comprising an assembly as described above. In certain embodiments, a seat belt retractor mechanism may be positioned above the rear axle of the vehicle and parallel with the top of the second-row seats.

Within the scope of this application it is expressly intended that the various aspects, embodiments, examples and alternatives set out in the preceding paragraphs, in the following description and/or drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1A:
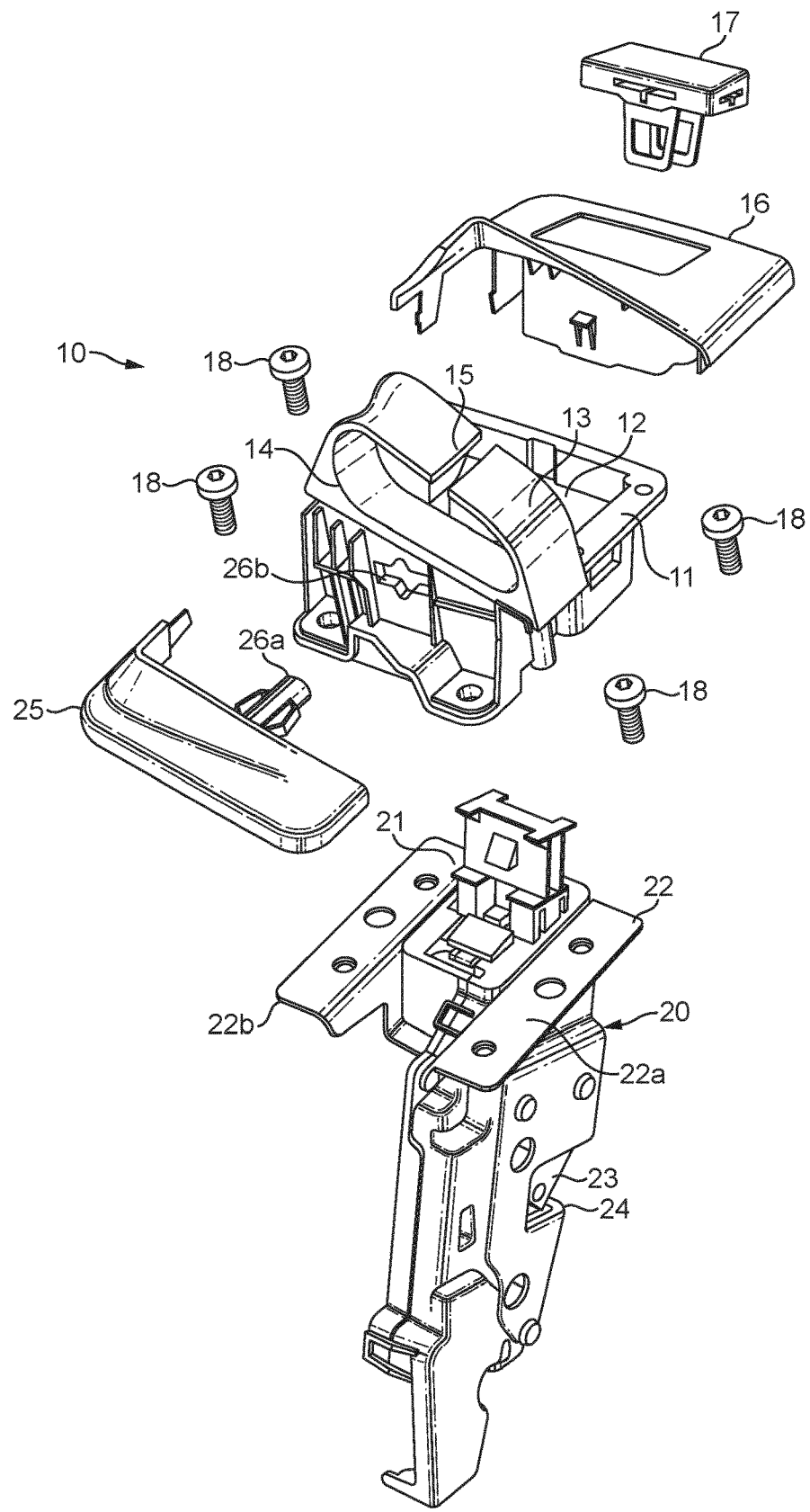
FIG. 1A shows a seat belt retainer and a seat latch mechanism in accordance with an embodiment of the invention.
Figure 1B:
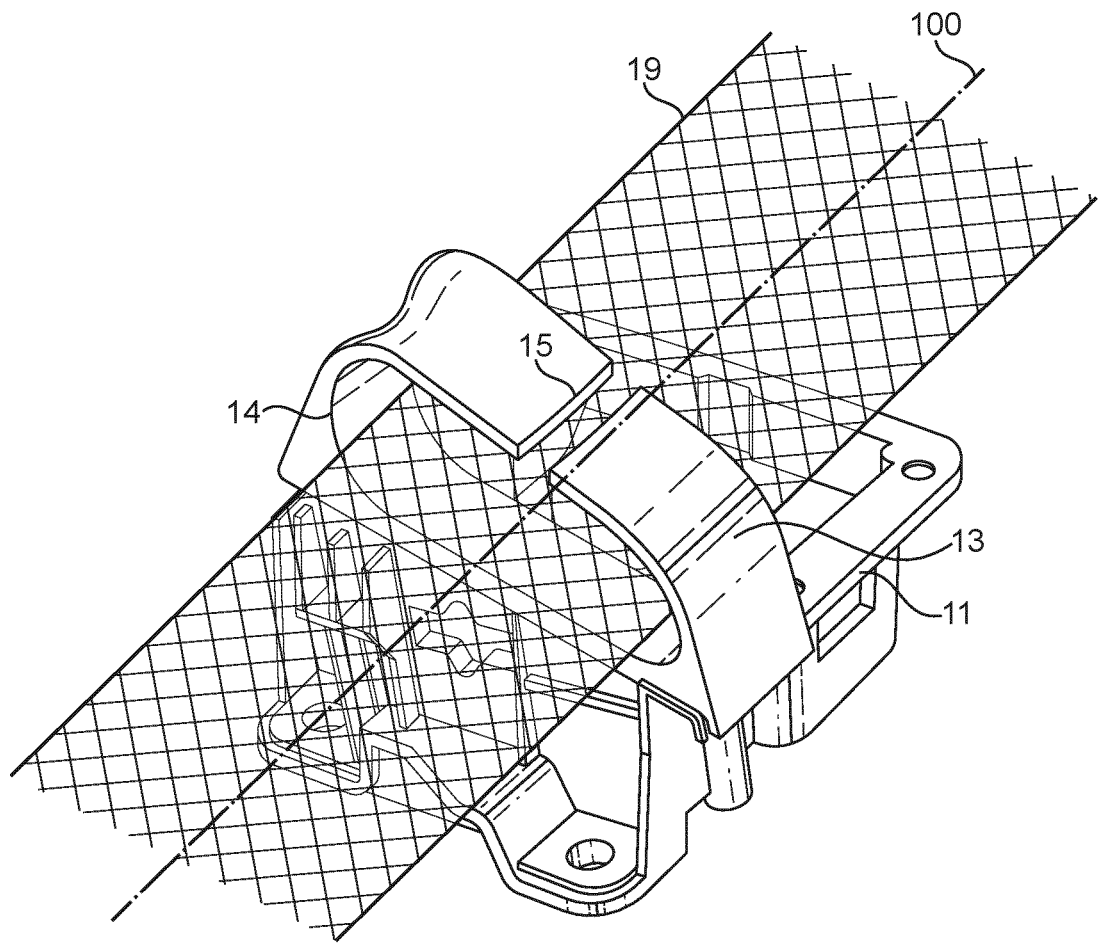
FIG. 1B shows a seat belt retainer in use in accordance with an embodiment of the invention.

Embodiments of the present invention relate to a seat belt retainer 10. FIG. 1A shows an exploded view of a seat belt retainer 10 according to an embodiment of the invention. The seat belt retainer 10 comprises a guide 13 supported on a body 11. In certain embodiments, the guide 13 may be integrally formed with the body 11. The guide 13 is for guiding a seat belt 19 as will be explained. The guide 13 defines an at least partial aperture 14 for receiving the seat belt 19 therethrough, as shown in FIG. 1B. The aperture 14 may be shaped to enable a seat belt 19 to pass therethrough without deforming the shape of the seat belt 19 (i.e. the webbing of the seat belt 19 remains substantially flat as it passes through the aperture 14). As such, the aperture 14 may have a substantially oval or oblong cross-section where the cross-section is in a plane perpendicular to a longitudinal axis 100 of the seat belt 19 passing through the aperture 14.

The guide 13 is configured to enable a seat belt 19 to be inserted into or released from the aperture 14 during use. Insertion or release of the seat belt 19 may facilitate folding of a seat associated with the retainer 10. In the embodiment shown in FIGS. 1A and 1B, the guide 13 comprises a slot 15 for inserting the seat belt 19 into, or releasing the seat belt 19 from, the aperture 14. The slot 15 is positioned in the guide 13 so that the seat belt 19 requires user input or manipulation to be inserted into or released from the aperture 14. As shown in the non-limiting embodiment of FIG. 1A, the guide 13 may comprise an at least partial loop. The slot 15 may be substantially in the centre of the loop of the guide 13 so that, in use, the slot 15 is substantially aligned with the centre of the cross-section of the seat belt 19 which may facilitate seat belt 19 removal.

Figure 2:
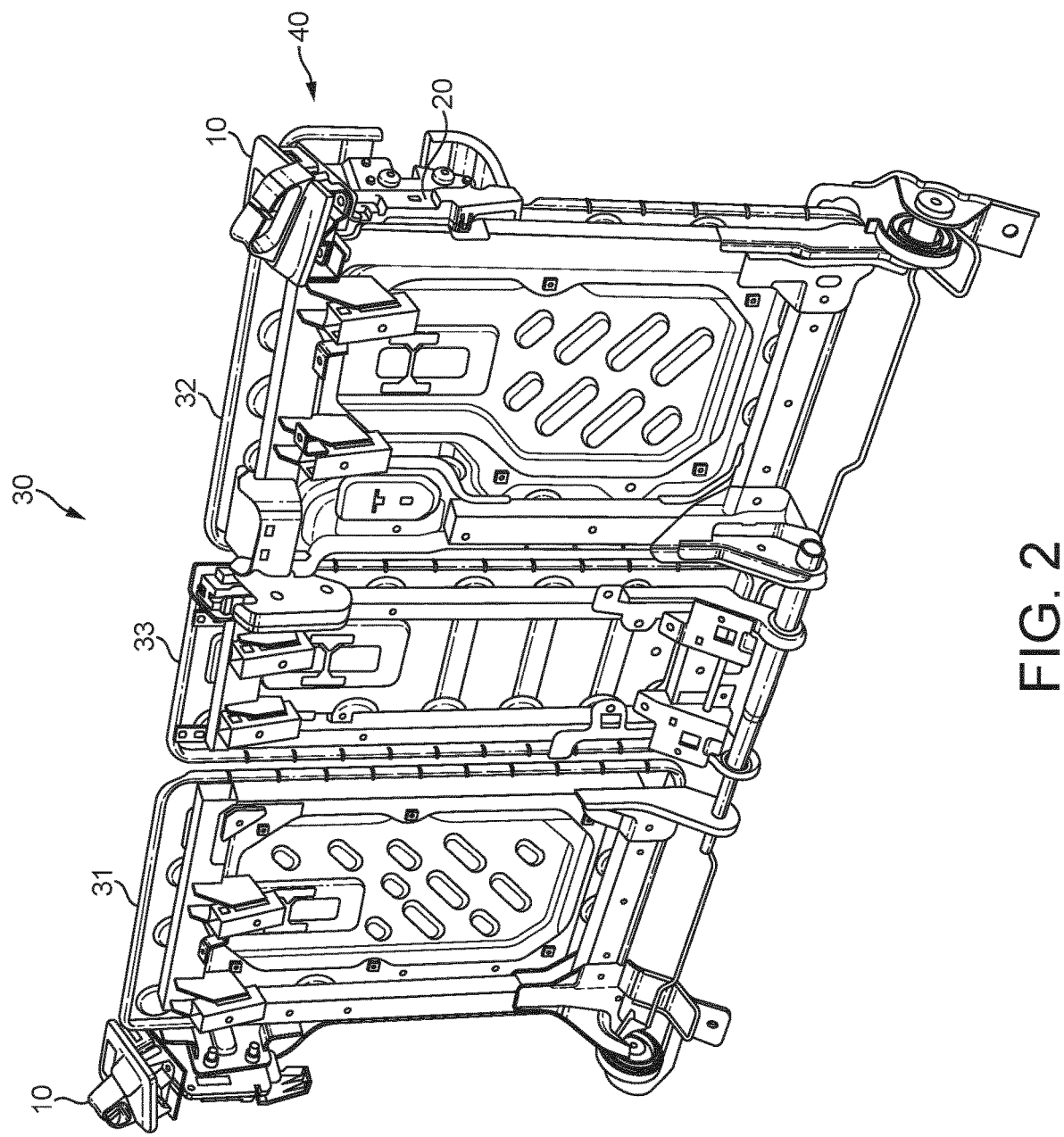
FIG. 2 shows a vehicle seat frame in accordance with an embodiment of the invention.

The body 11 is configured for attachment to a support 20. In some embodiments, the support may be a seat latch mechanism 20 as will be explained. The support 20 may be configured to mount the seat belt retainer 10 in a vehicle during use. For example, one or more seat belt retainers 10 may be indirectly mounted, via the support 20, on a vehicle seat frame 30. FIG. 2 shows a frame 30 for supporting rear seats, such as second-row seats, of a vehicle. The vehicle seat frame 30 may be configured to support a seat back of the seat. The frame 30 comprises a first section 31 and a second section 32 for supporting the outboard seats of a vehicle. The frame 30 comprises a third section 33, in some embodiments. The third section 33 may support a centre seat or a centre arm rest which may include one or more storage compartments, a refrigerator and/or multimedia controls. In the embodiment shown in FIG. 2, the seat belt retainer 10 is mounted at an end of the seat frame 30, such as an outer end of the seat frame 30. Thus, the retainer 10 is arranged proximal to a door of the vehicle. In certain embodiments, a seat belt retainer 10 may be mounted at each end of a seat frame 30. Thus, at least two seat belt retainers 10 may be mounted upon the frame 30. The seat belt retainer 10 at least partially extends above a shoulder of the outer seats, at a side of each seat closest to a corresponding seat belt retractor (not shown), from which the seat belt 19 extends. As such, the guide 13 of the seat belt retainer 10 extends above the seat frame 30. The seat belt retainer 10 may alternatively or additionally be mounted to third-row seats in a vehicle.

In certain embodiments, the seat belt retractor may be positioned generally above the rear axle of the vehicle and generally parallel with the top of the second-row seats. The seat belt 19 may be inserted into the guide 13 which extends above the seat frame 30 to control or modify a path of the seat belt 19 over an occupant of a seat on the seat frame. The position of the seat belt 19 retained by the guide 13 provides a path of the seat belt 19. The seat belt retainer 10 may provide useful restraint when a child of approximately 10 years old is seated on a booster seat on top of a seat part (i.e. a generally horizontal seat cushion) of the vehicle seat.

In an embodiment the seat latch mechanism 20 is arranged to control latching of the seat. The seat latch mechanism 20 may be mounted on the seat frame 30. The seat latch mechanism 20 enables the position of the seat frame 30, and therefore position of the seat back, in the vehicle to be changed. The seat latch mechanism 20 facilitates the seat frame 30 being folded towards the floor of the vehicle and returned to an upright position. The seat latch mechanism 20 enables latching of the seat back in a generally upright position and release of the seat back to be folded in a down position.

With reference to FIG. 1A, in an embodiment the seat latch mechanism 20 comprises a jaw 24 with a movable tooth 23. The jaw 24 may comprise a recess in the seat latch mechanism 20. In the upright position, the tooth 23 engages a connector or projection such as a loop (not shown) on the vehicle body. The loop extends into the recess of the jaw 24 and the tooth 23 passes through the loop to hold the loop within the jaw 24. The engagement of the tooth 23 and the loop fixes the seat frame 30 in an upright position. To release the seat frame 30 from the upright position, the tooth 23 is moveable to release the loop from the jaw 24. The tooth 23 may be at least partially retracted into the seat latch mechanism 20. The seat latch mechanism 20 may comprise a shaft 21 operably coupled to the tooth 23. The shaft 21 operates the latch mechanism 20 to release the tooth 23 from the loop. The shaft 21 may be depressed into the seat latch mechanism 20 to operate the mechanism 20. Once the loop is released, the seat frame 30 is not fixed in the upright position. Thus, the seat frame 30 may be moved from the upright position and folded towards the floor of the vehicle. The seat frame 30 may be returned to the upright position from the folded position without the shaft 21 operating the seat latch mechanism 20. The tooth 23 comprises a curved side facing away from the seat latch mechanism 20. As the seat frame 30 is moved from the folded position to the upright position, the curved side of the tooth 23 contacts the loop of the connector causing the tooth 23 to be moved so that the loop can extend into the recess of the jaw 24. Once the loop is within the recess, the tooth 23 can move to engage the loop and hold the seat frame 30 in the upright position. In certain embodiments, a first seat latch mechanism 20 may be mounted to the first section 31 and a second set latch mechanism 20 may be mounted to the second section 32 of the seat frame 30. The seat frame 30 may be configured so that the first section 31 and the second section 32 may fold independently. In certain embodiments, the third section 33 may be configured to fold with one of the first section 31 and the second section 32.

In the embodiment shown in FIG. 2, the seat latch mechanism 20 is mounted at an outer end of the seat frame 30. The shaft 21 of the seat latch mechanism 20 is accessible to a user from above a shoulder of the corresponding seat. Thus, the seat latch mechanism 20 may be located in the same or similar location as the guide 13 of the seat belt retainer 10. There is limited space on the shoulder of a seat between the headrest and the edge of the seat to position the seat latch mechanism 20 and the guide 13. The space available is particularly limited in luxury car models which have wide headrests to maximise passenger comfort. As such, in an embodiment, an actuator 17 for the seat latch mechanism 20 is integrated into the seat belt retainer 10 so that the guide 13 and the actuator 17 can both be positioned in the limited space available on the shoulder of a vehicle seat. To integrate the actuator 17 with the seat belt retainer 10, the body 11 of the seat belt retainer 10 comprises an opening 12 and the actuator 17 is moveably mounted within the opening 12. The actuator 17 is movable within the opening 12 for actuating the seat latch mechanism 20. The actuator 17 may engage the shaft 21 to operate the seat latch mechanism 20.

The actuator 17 and the guide 13 are at least partly aligned along the longitudinal axis 100 of the seat belt 19 when the seat belt 19 passes through the aperture 14 in use. The alignment of the actuator 17 and the guide 13 reduces the lateral space required for the seat belt retainer 10 on the shoulder of the seats. In certain embodiments, the actuator 17 and the guide 13 may be substantially aligned along the longitudinal axis 100 so that, in use, the seat belt 19 passes substantially over the actuator 17.

In the non-limiting embodiment shown in FIG. 1, the actuator 17 comprises a push button. The push button may be vertically aligned with the shaft 21 of the seat latch mechanism 20. The push button vertically actuates the seat latch mechanism 20. Thus, the use of a push button requires a minimal amount of space and facilities the integration of the actuator 17 with the seat latch mechanism 20.

In certain embodiments, the body 11 of the seat belt retainer 10 may comprise an indicator (not shown) for indicating a status of the seat latch mechanism 20. The indicator is arranged in relation to the actuator 17 to indicate a position of the actuator 17 and, consequently, the status of the seat latch mechanism 20. For example, the indicator may indicate whether the tooth 23 is engaged with the connector. The indicator may at least partially surround or may completely surround the actuator 17. The indicator may comprise a coloured portion of the body 11 which when visible indicates the status of the seat latch mechanism 20. For example, the coloured portion may be visible when the seat latch mechanism 20 is engaged. In the embodiment shown in FIG. 1, the seat latch mechanism 20 comprises a bezel 16. The bezel 16 may at least partially surround the actuator 17. At least a portion of the bezel 16 may comprise the indicator.

FIG. 2 shows an assembly 40 comprising the latch mechanism 20 and the seat belt retainer 10 mounted on the seat frame 30, according to an embodiment of the invention. The body 11 of the seat belt retainer 10 may be supported by the seat latch mechanism 20. In the embodiment shown in FIG. 1, the seat latch mechanism 20 comprises a pair of shoulders 22 on which the seat belt retainer 10 may be supported. The seat belt retainer 10 is attached to the seat latch mechanism 20 by a plurality of fixings 18. In certain embodiments, the plurality of fixings 18 may comprise screws, bolts and/or rivets. In certain embodiments, the seat belt retainer 10 is attached to the seat latch mechanism 20 by four bolts. The seat belt retainer 10 is attached to the seat latch mechanism 20 so that, in use, forces incident on the retainer 10 from a seat belt 19 are generally transmitted to the latch mechanism 20. In certain embodiments, the shoulders 22 of the seat latch mechanism 20 may be configured to withstand occupant deceleration forces received via the retainer. The shoulders 22 of the latch mechanism 20 may be reinforced to withstand the deceleration forces. The shoulders 22 may comprise one or more metal sheets to withstand the deceleration forces. In certain embodiments, the shoulders 22 may comprise flanges that extend outwardly from the seat latch mechanism 20.

In certain embodiments, a front cap 25 may be attachable to the body 11 of the seat belt retainer 10. The front cap 25 may be attached to the body 11 on the opposite side of the guide 13 to the actuator 17. As shown in FIG. 1A, the front cap may enclose one or more of the plurality of fixings 18.

As such, the front cap 25 may improve the aesthetic appearance of the seat belt retainer 10 whilst allowing easy access to one or more of the plurality of fixings 18. In certain embodiments, the front cap 25 may comprise a protrusion 26a and the body 11 may comprise a correspondingly shaped recess 26b so that the front cap 25 and body 11 may be connected using a push fit.

The guide 13 of the seat belt retaining device 10 may be used to modify or control the path of the seat belt 19 when the seat is in an upright position and when the seat is in a reclined position. As described above, the seat latch mechanism 20 engages a hoop on the vehicle body when in the upright position. The connector is movable relative to the vehicle body so that the seat can move between the upright position and a reclined position. In certain embodiments, the connector may be moved rearwards relative to the vehicle body to move a seat from the upright position to a reclined position.

The position of the seat belt 19 across an occupant can be modified by the aperture 14 of the retaining device being inclined relative to the shoulders 22 of the seat latch mechanism 20. The inclination of the aperture 14 may be chosen to ensure an optimal path for the seat belt 19 when the vehicle seat is in a reclined position and in an upright position. In certain embodiments, the aperture 14 may be inclined at a first angle relative to a first plane of the shoulders 22. The first plane of the shoulders 22 is defined by an upper surface 22a of the shoulders on which the seat belt retainer 10 is supported. The first angle may be within the range of 10° to 30° or 15° to 25°. In certain embodiments, the aperture 14 may be inclined at a second angle relative to a second plane of the shoulders 22. The second plane of the shoulders 22 is a plane perpendicular to the front edge 22b of the shoulders 22 where the front edge 22b is the edge closest to the front of the vehicle when the latch mechanism is installed in the vehicle. The second angle may be within the range of 0 to 15°. As illustrated in FIG. 1A the front cap 25 and the bezel may be shaped by a first angle and/or a second angle to follow that of the inclination of the aperture 14.

Figure 3:
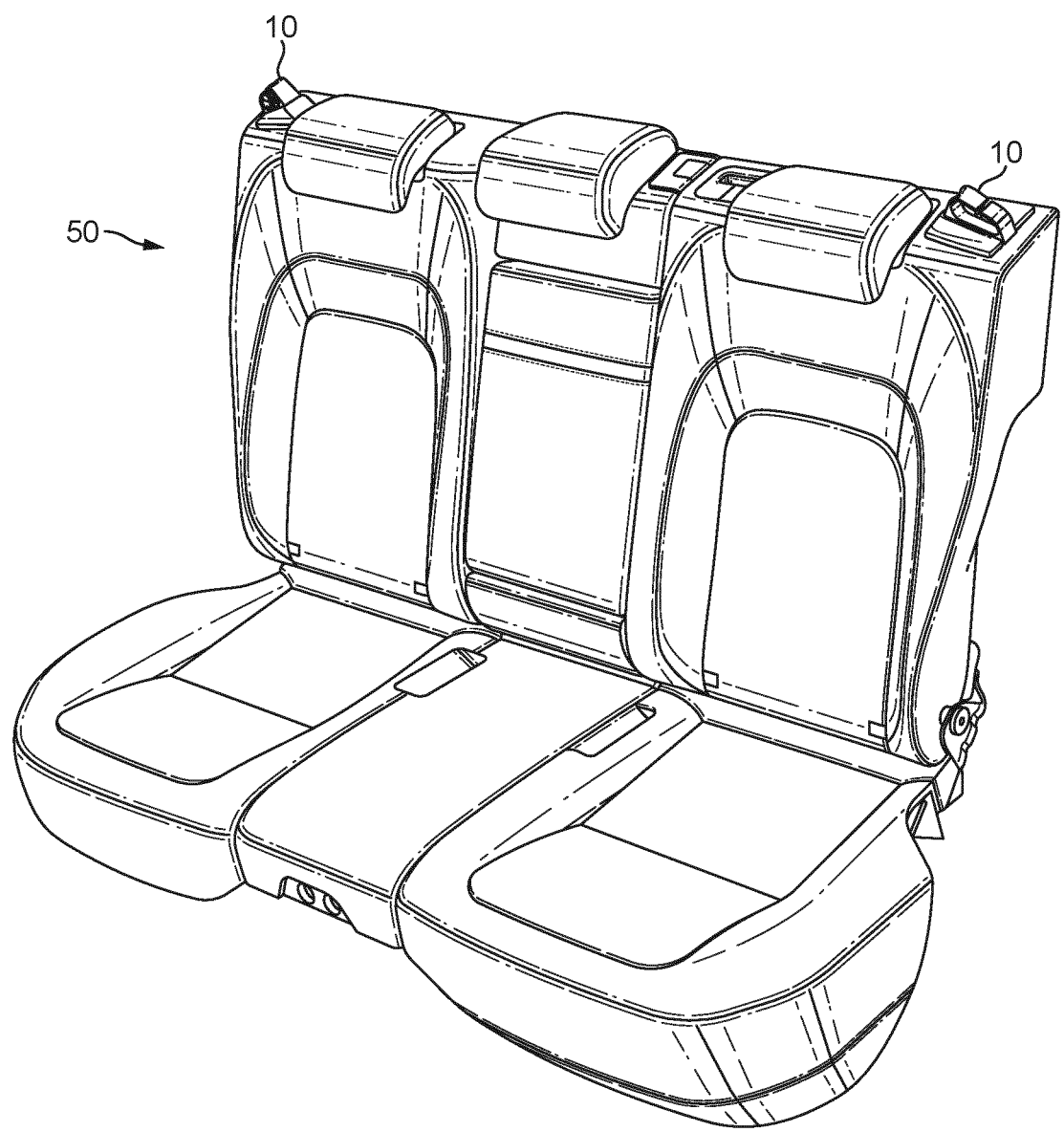
FIG. 3 shows a row of vehicle seats in accordance with an embodiment of the invention.

FIG. 3 shows a row of vehicle seats 50 according to an embodiment of the invention. The row of seats 50 include a seat belt retainer 10 at each outer end of the row of seats 50. In certain embodiments, row of seats 50 may include the assembly 40.

Figure 4:
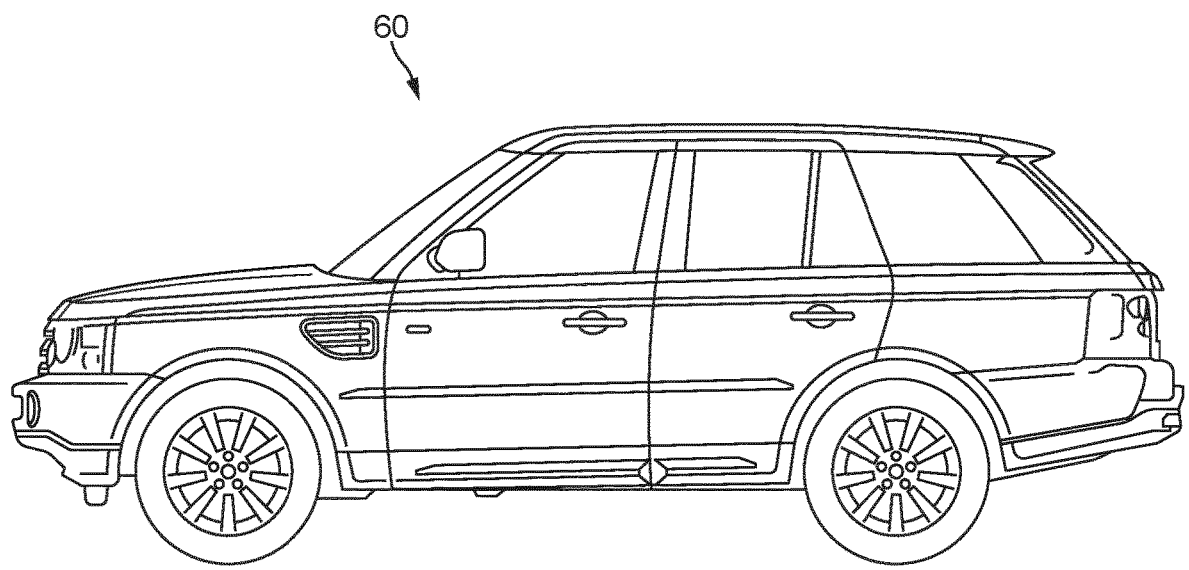
FIG. 4 shows a vehicle in accordance with an embodiment of the invention.

FIG. 4 shows a vehicle 60 according to an embodiment of the invention. In certain embodiments, the vehicle 60 may include the seat belt retainer 10. In certain embodiments, vehicle 60 may include the assembly 40.

All of the features disclosed in this specification (including the abstract and/or drawings), and/or all of the steps of any method or process so disclosed, may be combined in any combination, except combinations where at least some of such features and/or steps are mutually exclusive.

Each feature disclosed in this specification (including the abstract and/or drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including the abstract and/or drawings), or to any novel one, or any novel combination, of the steps of any method or process so disclosed. The claims should not be construed to cover merely the foregoing embodiments, but also any embodiments which fall within the scope of the claims.

The invention claimed is:

1. A seat belt retainer for a vehicle, the seat belt retainer comprising:
   a body having an opening, the body being configured for attachment to a support;
   an actuator mounted within the opening, the actuator being moveable within the opening for actuating a seat latch mechanism; and
   a guide supported by the body, the guide defining an at least partial aperture for receiving a seat belt therethrough,
   wherein the actuator and the guide are at least partly aligned along a longitudinal axis of the seat belt passing through the at least partial aperture, in use, and
   wherein the support is the seat latch mechanism.

2. The seat belt retainer of claim 1, wherein the actuator and the guide are substantially aligned along the longitudinal axis of the seat belt passing through the at least partial aperture, in use.

3. The seat belt retainer of claim 1, wherein the actuator comprises a push button.

4. The seat belt retainer of claim 1, further comprising an indicator for indicating a status of the seat latch mechanism.

5. The seat belt retainer of claim 4, wherein the indicator at least partially surrounds the actuator.

6. The seat belt retainer of claim 4, wherein a bezel at least partially surrounds the actuator, wherein at least a portion of the bezel comprises the indicator.

7. The seat belt retainer of claim 1, wherein the guide is integral with the body.

8. The seat belt retainer of claim 1, wherein the guide comprises an at least partial loop.

9. The seat belt retainer of claim 1, wherein the guide comprises a slot for inserting the seat belt into, or releasing the seat belt from, the at least partial aperture.

10. A vehicle comprising the seat belt retainer of claim 1.

11. An assembly, comprising:
    a seat belt retainer for a vehicle, the seat belt retainer comprising:
       a body having an opening, the body being configured for attachment to a support;
       an actuator mounted within the opening, the actuator being moveable within the opening for actuating a seat latch mechanism; and
       a guide supported by the body, the guide defining an at least partial aperture for receiving a seat belt therethrough,
       wherein the actuator and the guide are at least partly aligned along a longitudinal axis of the seat belt passing through the at least partial aperture, in use; and
    the seat latch mechanism,
       wherein the seat belt retainer is attached to the seat latch mechanism by a plurality of fixings.

12. The assembly of claim 11, wherein the seat latch mechanism comprises
    a jaw with a movable tooth for releasable engagement with a projection on a vehicle body, and wherein the actuator is moveable within the opening for actuating the movable tooth.

13. A vehicle comprising the assembly of claim 11.

14. An assembly, comprising:
    a seat belt retainer for a vehicle, the seat belt retainer comprising:
       a body having an opening, the body being configured for attachment to a support;

an actuator mounted within the opening, the actuator being moveable within the opening for actuating a seat latch mechanism; and a guide supported by the body, the guide defining an at least partial aperture for receiving a seat belt therethrough, wherein the actuator and the guide are at least partly aligned along a longitudinal axis of the seat belt passing through the at least partial aperture, in use; and the seat latch mechanism, wherein the seat latch mechanism comprises shoulders for supporting the seat belt retainer thereon.

15. The assembly of claim 14, wherein the shoulders of the seat latch mechanism are configured to withstand occupant deceleration forces received via the seat belt retainer.

16. A vehicle comprising the assembly of claim 14.

17. The assembly of claim 14, wherein the seat latch mechanism comprises a jaw with a movable tooth for releasable engagement with a projection on a vehicle body, and wherein the actuator is moveable within the opening for actuating the movable tooth.

18. An assembly, comprising:

a seat belt retainer for a vehicle, the seat belt retainer comprising:

a body having an opening, the body being configured for attachment to a support;

an actuator mounted within the opening, the actuator being moveable within the opening for actuating a seat latch mechanism; and a guide supported by the body, the guide defining an at least partial aperture for receiving a seat belt therethrough, wherein the actuator and the guide are at least partly aligned along a longitudinal axis of the seat belt passing through the at least partial aperture, in use; and the seat latch mechanism, wherein the at least partial aperture is inclined relative to shoulders of the seat latch mechanism.

19. A vehicle comprising the assembly of claim 18.

20. The assembly of claim 18, wherein the seat latch mechanism comprises a jaw with a movable tooth for releasable engagement with a projection on a vehicle body, and wherein the actuator is moveable within the opening for actuating the movable tooth.

* * * * *